United States Patent [19]

Fava et al.

[11] 4,221,880
[45] Sep. 9, 1980

[54] MOLDABLE BLEND OF INTERPOLYMER OF RUBBER, MALEIC ANHYDRIDE AND STYRENE WITH POLYPHENYLENE OXIDE

[75] Inventors: Ronald A. Fava, Monroeville; Kenneth W. Doak, Murraysville, both of Pa.

[73] Assignee: Arco Polymers, Inc., Philadelphia, Pa.

[21] Appl. No.: 962,368

[22] Filed: Nov. 20, 1978

[51] Int. Cl.$^2$ ............................................. C08L 53/00
[52] U.S. Cl. ...................................... 525/92; 525/285
[58] Field of Search .............. 260/876 B, 874; 525/92, 525/285

[56] References Cited

U.S. PATENT DOCUMENTS

| | | | |
|---|---|---|---|
| 4,097,550 | 6/1978 | Haaf et al. | 260/876 B |
| 4,113,797 | 9/1978 | Lee | 260/876 B |
| 4,131,598 | 12/1978 | Abolins et al. | 260/42.18 |

*Primary Examiner*—Richard B. Turer
*Attorney, Agent, or Firm*—John R. Ewbank

[57] ABSTRACT

The invention concerns thermoplastic molding compositions consisting essentially of a blend of:
  A. From about 40% to about 95% by weight of a interpolymer comprising from about 8 to about 15% block interpolymers prepared in a stereospecific system using from 5% to 35% vinyl aromatic compound and from 65 to 95% conjugated alkadiene, and about 84 to about 92% of a mixture containing from about 88 to about 93% sytrene and from about 7 to about 12% unsaturated dicarboxylic acid anhydride selected from the group consisting of maleic anhydride and citraconic anhydride.
  B. From about 5% to about 60% of a polyphenylene oxide.

1 Claim, No Drawings

MOLDABLE BLEND OF INTERPOLYMER OF RUBBER, MALEIC ANHYDRIDE AND STYRENE WITH POLYPHENYLENE OXIDE

RELATED INVENTIONS

Reference is made to three applications filed Nov. 20, 1978, identifying Ronald A. Fava, as at least a co-inventor that is, Ser. No. 962,367, concerning "TERNARY BLEND OF POLYSTYRENE, POLYPHENYLENE OXIDE AND COPOLYMER COMPRISING MALEIC ANHYDRIDE AND STYRENE", and Ser. No. 962,499, concerning "TRANSPARENT BLEND OF RESIN AND BLEND CONTAINING POLYPHENYLENE OXIDE", and Ser. No. 962,505, "MALEIC ANHYDRIDE COPOLYMER AND POLYPHENYLENE OXIDE", and all the disclosures of each of said patent applications are deemed here reiterated and incorporated herein.

BACKGROUND OF INVENTION

This invention relates to moldable materials prepared by blending thermoplastic compositions to obtain multiple component blends which have a combination of advantageous characteristics. The conversion of plastics utilizes machinery adapted to fabricate the plastic at temperatures within a range which is significantly narrower than the range of softening points of the polymeric resins which scientists have produced.

Polyphenylene oxide is an example of a polymer having a softening point which is sufficiently high that it is not practical to employ some conventional equipment for modling articles of polyphenylene oxide. However, polyphenylene oxide has been a component in blends which can be molded at temperatures of interest to some fabricators.

Polystyrene is among the less costly of commercially used resins, but some types of polystyrene have softening points which are low enough to limit the utility of the resin. Various proposals have been made for blends comprising polyphenylene oxide and polystyrene.

Lauchlan, et al, U.S. Pat. No. 3,660,531 describes the preparation of a resin blend containing polystyrene and significant amounts of an elastomer for imparting impact resistance and containing polyphenylene oxide to impart a higher moldingtemperature.

Cizek, U.S. Pat. No. 3,383,435 describes blends comprising styrene resin and polyphenylene ether.

Fox, U.S. Pat. No. 3,356,761 disperses powdered polyphenylene oxide in styrene or slightly modified styrene and polymerizes the composition to provide a moldable composition.

Gowan, U.S. Pat. No. 3,373,226 prepares films from a blend of polystyrene and polyphenylene oxide.

Most attempts to mix pellets of different molding compositions are unsatisfactory because of the general incompatibility of polymeric materials. When a mixture of molding pellets is extruded, there is generally a very weak extrudate by reason of the fracture lines at the boundaries amongst the different compositions. The discovery of a compatible blend of plastics, sometimes referred to as "plastic alloys", is a significant and unexpected discovery by reason of the incompatibility of most of the conceivable permutations of mixtures of plastics.

Notwithstanding the persistent effort to prepare appropriate blends, there has been a failure by others to prepare blends meeting some of the combinations of desired properties which are attained by the present invention.

SUMMARY OF THE INVENTION

In accordance with the present invention, a thermoplastic molding composition consists essentially of a blend of:

A. From about 40% to about 95% by weight of a interpolymer comprising from about 8 to about 16% block interpolymer prepared in a stereospecific system using from 5% to 35% vinyl aromatic compound and from 65 to 95% conjugated alkadiene, and about 84 to about 92% of a mixture containing from about 88 to about 93% sturene and from about 7 about 12% unsaturated dicarboxylic acid anhydride selected from the group consisting of maleic anhydride and citraconic anhydride.

B. From about 5% to about 60% of a polyphenylene oxide.

The invention is further clarified by reference to a plurality of preparations, comprising controls and examples.

CONTROL A

Polystyrene can be prepared as a molding resin by polymerizing styrene to provide a solid having a softening temperature within the range of molding machines. One of the methods by which a molding composition is prepared having some of the advantages of polystyrene but having a higher softening temperature is by the use of a controlled amount of an anhydride of a dicarboxylic acid having ethylene-type unsaturation. A composition, designated as interpolymer A, can be prepared by the copolymerizaton of about 8% maleic anhydride and the balance styrene.

A copolymer, designated as interpolymer B, is prepared from about 11% stereospecific rubber, about 7% maleic anhydride, and about 82% styrene.

A interpolymer is prepared so that it contains about 16% stereospecific rubber, about 9% maleic anhydride, and about 75% styrene, such composition being designated as interpolymer C. A stereospecific rubber is prepared by the copolymerization of about 27% vinyl aromatic compound (e.g. styrene) and from 73% butadiene. This stereospecific rubber is designated as composition D. Polyphenylene oxide is abbreviated as PPO.

The properties of selected component compositions were measured to obtain the data in Table 1. t,0050

A molding composition blend was prepared by utilizing an extruder in which the mixture formed in such extruder was divided, two-thirds being directed for forward processing and extrusion, and one-third of such mixture being directed for recycle through the mixing zone of the extruder. Operating a conventional extruder so that internal recycling occurs, and so that the rate of feeding fresh pellets and the rate of extrusion of product pellets is about half of that which would normally occur with a comparable amount of material in the extruder and comparable power consumption. Other variations of blending partaking of the nature of recycle extrusion may be employed.

A control composition was prepared consisting of an equal mixture of composition A and of polyphenylene oxide. This blend proved to be compatible and to have the combination of properties of an Izod strength of 0.3 ft-lb/in. and a Vicat temperature of 320° F. The composition proved to lack the impact resistance often desired today for plastic articles.

EXAMPLE 1

Using procedures of the type discussed in Control A, a blend was prepared consisting of 10% polyphenylene oxide and 90% composition B. The advantageous blend had a Vicat temperature of 250° F. instead of the Vicat temperature of 240° F. of component B. The blend was useful for the molding of articles having both impact resistance and resistance to softening with moderate heat.

EXAMPLE 2

Pellets of polyphenylene oxide and of composition B were thoroughly mixed to provide a blend containing 75% of the interpolymer designated as composition B and 25% polyphenylene oxide. Such blend had an Izod strength of 0.3 ft-lb/in. and a Vicat temperature of 269° F. Such blend proved to be of value in the molding of articles having a reasonable amount of impact resistance.

EXAMPLE 3

A blend was prepared consisting of equal parts by weight of polyphenylene oxide and said composition B. The blend had properties leading to an Izod value of 0.4 ft-lb/in. and a Vicat temperature of 313° F. Articles are molded from pellets of such blend, such articles having an advantageous combination of resistance to thermal softening and impact resistance.

EXAMPLE 4

A blend was prepared consisting of equal parts by weight of polyphenylene oxide and composition C. The blend was satisfactory for the fabrication of articles requiring a reasonable resistance to impact and shock. The blend had an Izod value of 2.0 ft-lb/in. and a Vicat temperature of 333° F.

It is important that the blend be prepared from polyphenylene oxide and said composition C. In a control preparation, a three component blend consisting of about 8% composition D (a stereospecific rubber derived from 77% butadiene and 23% styrene), about 42% composition A (thus providing components resembling 50% composition C) and 50% polyphenylene oxide was evaluated and found to be significantly more brittle, having an Izod strength of only 1 ft-lb/in., or half that of the blend of the present invention.

By a series of tests, it is established that the concentration of the polyphenylene oxide should be within a range of about 5% to about 60% by weight of the blend. Similar tests showed that the concentration of the interpolymer should be from about 40% to about 95%. The interpolymer should contain from about 7 to about 12% unsaturated dicarboxylic acid anhydride selected from the group consisting of maleic anhydride and citraconic anhydride. The interpolymer is desirably of the general nature of composition B or composition C. The tests establish that the interpolymer must contain from about 8 to about 16% block interpolymer prepared in a stereospecific system using from 5% to 35% vinyl aromatic compound and from 65% to 95% conjugated alkadiene, said interpolymer consisting predominantly of from about 84 to about 92% of a mixture containing from about 88 to about 93% styrene and from about 7% to about 12% unsaturated dicarboxylic acid anhydride selected from the group consisting of maleic anhydride and citraconic anhydride.

The invention claimed is:

1. Thermoplastic molding compositions consisting of a two-component blend of:
   A. From about b 40% to about 95% by weight of an interpolymer comprising from about 8 to about 16% block copolymer prepared in a stereospecific system using from 5% to 35% vinyl aromatic compound and from 65 to 95% conjugated alkadiene, and polymerizing in the presence of said block copolymer about 84 to about 92% of a mixture containing from about 88 to about 93% styrene and from about 7 to about 12% unsaturated dicarboxylic acid anhydride selected from the group consisting of maleic selected from the group consisting of maleic anhydride and citraconic anhydride.
   B. From about 5% to about 60% of a polyphenylene oxide.

* * * * *